(12) United States Patent
Holobinko et al.

(10) Patent No.: US 10,938,478 B2
(45) Date of Patent: Mar. 2, 2021

(54) REDUCING DYNAMIC POWER IN CABLE ACCESS NETWORKS

(71) Applicant: Cisco Technology, Inc., San Jose, CA (US)

(72) Inventors: John Holobinko, Fort Mill, SC (US); John Alexander Ritchie, Jr., Duluth, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/542,977

(22) Filed: Aug. 16, 2019

(65) Prior Publication Data

US 2020/0076507 A1 Mar. 5, 2020

Related U.S. Application Data

(60) Provisional application No. 62/725,036, filed on Aug. 30, 2018.

(51) Int. Cl.
*H04B 10/2575* (2013.01)
*H04B 10/079* (2013.01)
*H04B 10/516* (2013.01)

(52) U.S. Cl.
CPC ... *H04B 10/25751* (2013.01); *H04B 10/0793* (2013.01); *H04B 10/07955* (2013.01); *H04B 10/5161* (2013.01)

(58) Field of Classification Search
CPC .......... H04B 10/25751; H04B 10/0793; H04B 10/07955; H04B 10/5161
USPC .......................................................... 398/38
See application file for complete search history.

(56) References Cited

U.S. PATENT DOCUMENTS

| | | | |
|---|---|---|---|
| 10,505,499 B1* | 12/2019 | Bonen | H03F 3/68 |
| 2003/0066088 A1* | 4/2003 | Jung | H04L 25/242 725/111 |
| 2015/0049822 A1* | 2/2015 | Schemmann | H03F 1/02 375/257 |
| 2015/0222449 A1* | 8/2015 | Salinger | H04L 27/0002 370/419 |
| 2018/0131582 A1* | 5/2018 | Schnitzer | H04L 12/2869 |
| 2018/0213305 A1* | 7/2018 | Campos | H04Q 11/0005 |
| 2019/0190736 A1* | 6/2019 | Ulm | H04L 12/2801 |
| 2019/0379921 A1* | 12/2019 | Zinevich | H04B 3/46 |

* cited by examiner

*Primary Examiner* — Dalzid E Singh
(74) *Attorney, Agent, or Firm* — Merchant & Gould P.C.

(57) ABSTRACT

Dynamic power in cable access networks may be reduced. First, a peak data rate associated with a network may be determined. Then, a modulation order and an associated Radio Frequency (RF) level that will support the determined peak data rate may be determined. Next, a power value to be transmitted by a node in the network based on the determined modulation order and the associated RF level may be determined. A bias value may then be determined for the node to support the determined power value.

20 Claims, 4 Drawing Sheets

REDUCING DYNAMIC POWER IN CABLE ACCESS NETWORKS

RELATED APPLICATION

Under provisions of 35 U.S.C. § 119(e), Applicant claims the benefit of U.S. Provisional Application No. 62/725,036 filed Aug. 30, 2018, which is incorporated herein by reference.

TECHNICAL FIELD

The present disclosure relates generally to node power control.

BACKGROUND

A Hybrid Fiber-Coaxial (HFC) network is a broadband network that combines optical fiber and coaxial cable. It has been commonly employed globally by cable television operators. In a Hybrid Fiber-Coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services. Systems incorporate additional elements to transmit signals upstream from the subscriber to the distribution facility.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
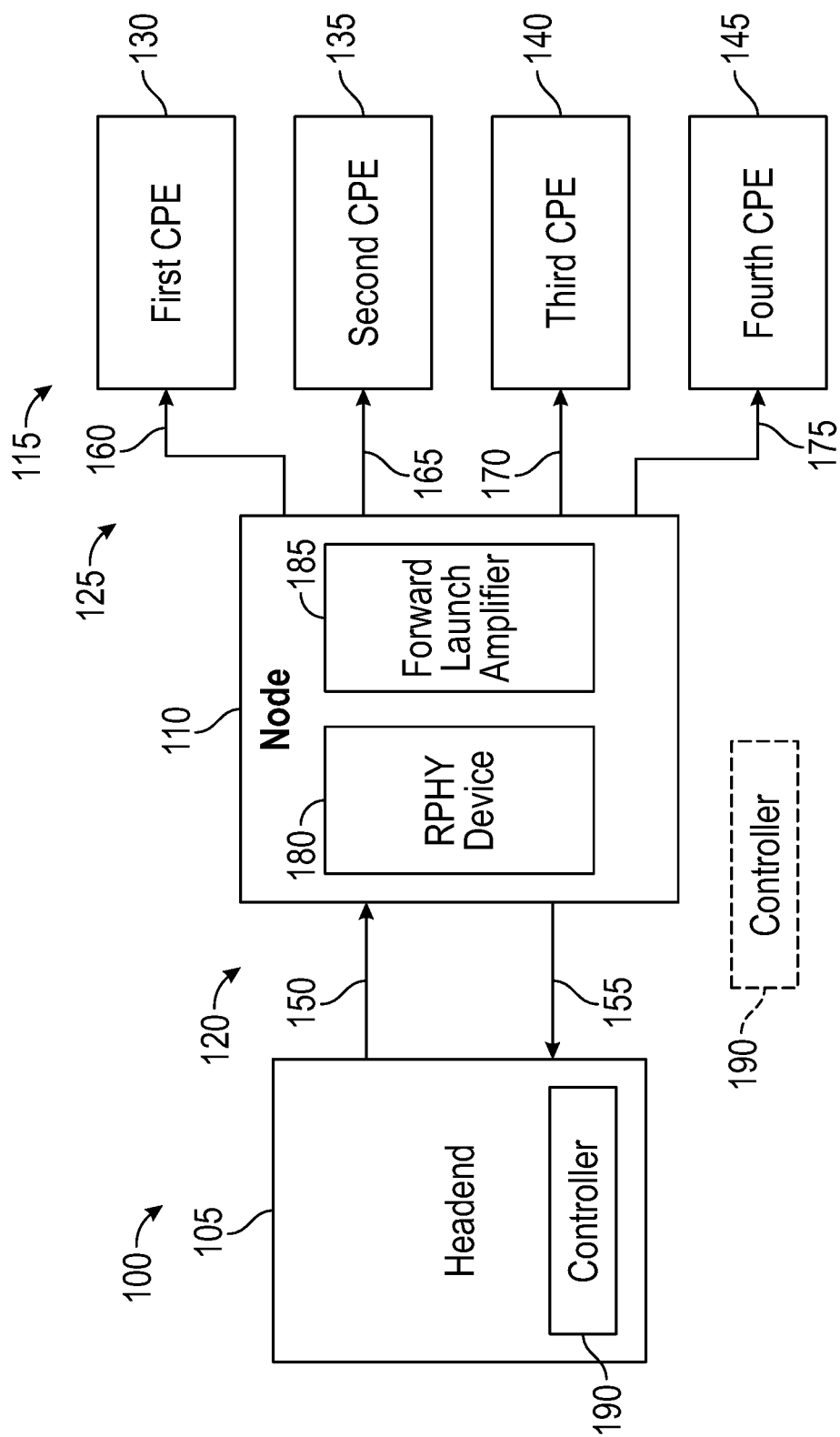
FIG. 1 is a block diagram of a communication system.

Dynamic power in cable access networks may be reduced. First, a peak data rate associated with a network may be determined. Then, a modulation order and an associated Radio Frequency (RF) level that will support the determined peak data rate may be determined. Next, a power value to be transmitted by a node in the network based on the determined modulation order and the associated RF level may be determined. A bias value may then be determined for the node to support the determined power value.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-System Operators (MSOs) may comprise operators of multiple cable or direct-broadcast satellite television systems. Fiber Deep (FD) is a trend in which MSOs push fiber ever closer to customers to provide them with better service. As opposed to an amplifier, a Hybrid Fiber-Coaxial (HFC) node may receive signals from a headend via fiber optic cable rather than via coaxial cable for example. In order to provide FD, many HFC nodes may be deployed onto an FD network.

The nodes in the HFC network may include a forward launch amplifier that may amplify the analog downstream signals to the customer premises equipment. With conventional nodes, a launch amplifier bias current and/or bias voltage may be set at a static value that may cause the forward launch amplifier to work across a predefined frequency spectrum that the node may be initially expected to operate within or with a particular Quadrature Amplitude Modulation (QAM) mode. However, in certain situations, the node may operate below or above the predefined frequency spectrum or in a different QAM mode. Accordingly, the aforementioned static values may cause the node to waste power or provide a degraded signal when the node is called upon to operate in a manner inconsistent with the aforementioned static launch amplifier bias current value and/or bias voltage value.

Nodes and amplifiers may consume significant amounts of power. Power savings in the access network may represent a potentially large operational savings for system operators. Embodiments of the disclosure may use a combination of measurements and calculations to achieve power savings in cable systems. Embodiments of the disclosure described herein may overcome the limitations of conventional power saving techniques to provide quasi-dynamic power savings.

Embodiments of the disclosure may enable appreciable variable power savings without impacting signal latency or requiring any new circuitry in intelligent nodes and amplifiers (which may have the ability to remotely adjust their Radio Frequency (RF) power biases.) The power savings may be in addition to any power savings contribution from Digital Predistortion (DPD) technology, and may be compatible with DPD, but may not require DPD, and it may not require a Distributed Access Architectures (DAA) architecture. DAA may be required for DPD.

FIG. 1 is a block diagram of a communication system 100. As shown in FIG. 1, communication system 100 may comprise a headend 105, a node 110, a plurality of customer premises equipment 115, a plurality of headend communication lines 120, and a plurality of node communication lines 125. Headend 105 may comprise, but is not limited to, a cable television headend that may comprise a master facility for receiving television signals for processing and distribution over a cable television system (e.g., an HFC). Node 110 may receive downstream signals from headend 105 via fiber optic cable (e.g., headend communication lines 120) rather than via coaxial cable, for example.

Plurality of customer premises equipment 115 may comprise, for example, any terminal and associated equipment located at a subscriber's premises and connected with a carrier's telecommunication channel at a demarcation point. Plurality of customer premises equipment 115 may comprise a first customer premises equipment 130, a second customer premises equipment 135, a third customer premises equipment 140, and a fourth customer premises equipment 145. Ones of plurality of customer premises equipment 115, may comprise, but are not limited to, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

Plurality of headend communication lines 120 may comprise a first headend communication line 150 and a second headend communication line 155. Headend communication lines 120 may comprise optical fibers. Plurality of node communication lines 125 may comprise a first node communication line 160, a second node communication line 165, a third node communication line 170, and a fourth node communication line 175. Plurality of node communication lines 125 may comprise coaxial cables of varying lengths. While FIG. 1 shows each one of plurality of node communication lines 125 as serving one customer premises equipment, each one of plurality of node communication lines 125 may serve many customer premises equipment locations and is not limited to one.

As shown in FIG. 1, node 110 may comprise a Remote Physical Layer (RPHY) device 180 and a forward launch amplifier 185. Communication system 100 may further comprise a controller 190. Headend 105 may comprise a Converged Cable Access Platform (CCAP) core that may include a Cable Modem Termination System (CMTS). The CCAP may comprise a Cloud Native Broadband Router (cnBR) that may transform headend 105 by virtualizing hardware-based CCAP services, delivering the advantages of web-scale operations in a resilient, elastic, and openly composable set of microservices. The CMTS may be used to provide high speed data services, such as cable Internet or Voice-Over-Internet Protocol, to subscribers. Remote Physical Layer (i.e., RPHY) may comprise shifting or distributing the physical layer (i.e., PHY) of a conventional cable headend CMTS to fiber nodes (e.g., node 110). RPHY device 180 may comprise circuitry to implement the physical layer of a CMTS. Controller 190 may be located in headend 105 or in a remote location.

Digital signals received by RPHY device 180 may be converted to analog signals and sent to forward launch amplifier 185. The analog signals received at forward launch amplifier 185 may be amplified by forward launch amplifier 185 and then sent to plurality of customer premises equipment 115 over plurality of node communication lines 125. Forward launch amplifier 185 may be biased (e.g., driven) with a bias current equal to a bias current value and/or a bias voltage equal to a bias voltage value. The bias current and bias voltage may cause forward launch amplifier 185 to operate at a desired level that may minimize power usage without causing service disruption, data loss, or introduction of video impairments, for example. The desired level may comprise, for example, operating across a frequency spectrum that node 110 should operate within or with a particular QAM mode node 110 should operate at. Based on data, received for example from RPHY device 180, controller 190 may determine the bias current value and/or the bias voltage value that may cause forward launch amplifier 185 to operate at a desired level. Forward launch amplifier 185 may then be biased (e.g., driven) with the bias current equal to the bias current value and/or the bias voltage equal to the bias voltage value determined by controller 190.

Controller 190 may be practiced in hardware and/or in software (including firmware, resident software, microcode, etc.) or in any other circuits or systems. Controller 190 may be practiced in electrical circuits comprising discrete electronic elements, packaged or integrated electronic chips containing logic gates, a circuit utilizing a microprocessor, or on a single chip containing electronic elements or microprocessors. Furthermore, controller 190 may also be practiced using other technologies capable of performing logical operations such as, for example, AND, OR, and NOT, including but not limited to, mechanical, optical, fluidic, and quantum technologies.

Figure 2:
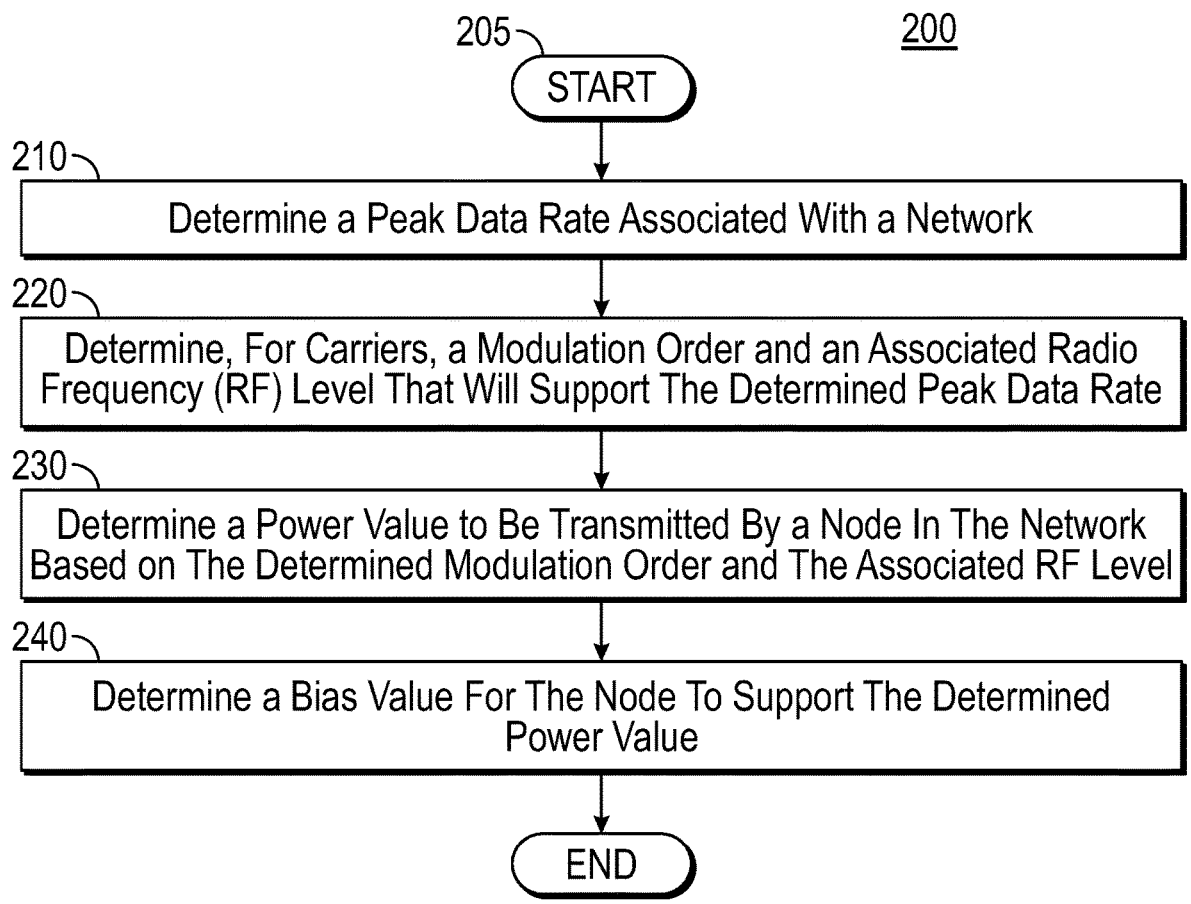
FIG. 2 is a flow chart of a method for reducing dynamic power in cable access networks.

FIG. 2 is a flow chart setting forth the general stages involved in a method 200 consistent with embodiments of the disclosure for reducing dynamic power in cable access networks. Method 200 may be implemented using controller 190 as described above with respect to FIG. 1, which may be embodied by computing device 400 described in more detail below with respect to FIG. 4. Ways to implement the stages of method 200 will be described in greater detail below.

Method 200 may begin at starting block 205 and proceed to stage 210 where controller 190 may determine a peak data rate associated with a network. For example, controller 190 may use peak data rate information gathered either from historical sampling or from real time sampling. The CCAP may monitor the peak traffic through the core every five minutes for example. Over the course of weeks, the data may be analyzed to determine the required capacity at any time of day and any day of the week. The data is relatively repeatable, and the year-over-year data rate may be predicted. The granularity of measurements maybe increased to measure down to the individual service group. To characterize traffic by service group, data analytics may be used. The CCAP may sample its throughput, and the granularity of sampling may even improve for the cloud native embodiment.

Figure 3:
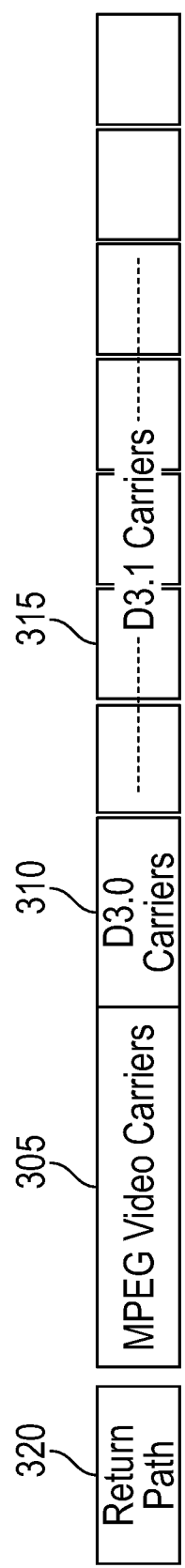
FIG. 3 illustrates a frequency spectrum.

FIG. 3 illustrates an example of a frequency spectrum of a signal that may be provided by the CCAP and sent by forward launch amplifier 185 to plurality of customer premises equipment 115 over plurality of node communication lines 125. For example, the analog signal received at forward launch amplifier 185 may be amplified and up tilted across all frequencies by forward launch amplifier 185. The up tilting of the signal may be provided in order to compensate for signal attenuation at higher frequencies in the plurality of node communication lines 125. As illustrated in FIG. 3, the frequency spectrum may be divided among QAM carriers. The QAM carriers may include MPEG video carries 305, Data Over Cable Service Interface Specification (DOCSIS) 3.0 carries 310, and DOCSIS 3.1 carriers 315. A portion of the spectrum may be designated for a return path 320.

From stage 210, where controller 190 determines the peak data rate associated with the network, method 200 may advance to stage 220 where controller 190 may determine, for carriers, a modulation order and an associated Radio Frequency (RF) level that will support the determined peak data rate. For example, the DOCSIS 3.1 specification defines a process for dynamically changing the modulation order of each carrier. The intent was to allow degrading of throughput on portions of the network that were noisy. Lowering the modulation order results in a need for lower signal quality.

For example, if carriers are operating at 4096 QAM, reducing them to 1024 QAM allows them to operate at a much lower signal level and associated power savings. The throughput difference between 4096 QAM and 1024 QAM is 210 versus 212, which means the throughput of 1024 QAM is $10/12$th or 83.3%. However, the additional 16.7% of speed requires the carriers to have twice the power. It is likely that during late night hours the modulation order might be able to be reduced to 256 QAM or possibly below. Because cable modems automatically adjust to the modulation order, no re-provisioning is required.

Once the data traffic patterns are determined, a calculation may be made for determining the minimum required modulation order. This may be based on the greater of the minimum total traffic level plus a safety factor, or the maximum data speed offered (so that even in the middle of the night, if a subscriber does a speed test, the maximum data speed can still be reached). Once the minimum required modulation order is chosen, a subsequent calculation may be made to determine the RF level required for each DOCSIS carrier based on its modulation profile.

The greater the number of DOCSIS 3.1 carriers, the greater the potential is for power savings. This is because MPEG video carriers are constantly on, whether or not anyone is watching. Once cable operators move to IP Video and smaller service groups, video becomes simply another unicast data stream. If no one is watching a carrier within a service group, there is no transmission of data. Therefore in off peak times, the amount of traffic transmitted across the service group may be that much less, and even lower modulation indexes may be employed. It is likely that the power savings across a system could be as high as 35% in off peak time periods.

Once controller 190 determines, for carriers, the modulation order and the associated RF level that will support the determined peak data rate in stage 220, method 200 may continue to stage 230 where controller 190 may determine a power value to be transmitted by node 110 in the network based on the determined modulation order and the associated RF level. For example, a calculation may be made for the total composite power value required to carry all the DOCSIS carriers and any MPEG video carriers simultaneously. The total composite output power may represent the power necessary to be transmitted by the RF output nodes (e.g., node 110) for that traffic.

After controller 190 determines the power value to be transmitted by node 110 in the network based on the determined modulation order and the associated RF level in stage 230, method 200 may proceed to stage 240 where controller 190 may determine a bias value for node 110 to support the determined power value. For example, working backwards from the determined power value, a calculation may be made for the bias voltage and/or bias current necessary on the nodes (e.g., node 110) to support the composite RF power value.

To initiate power savings, a command may be sent by controller 190 to the DOCSIS QAM modulators (e.g., in the CCAP) to select the appropriate modulation profile. A second command may be sent by controller 190 to the CCAP to adjust the associated RF level for each QAM carrier. A third command may be sent to node 110 to adjust the bias levels. If desired, the calculation may also include a "buffer" of additional capacity beyond the measured time of day demand, to insure against a short burst of demand above the required capacity.

By being able to change, for example, the DOCSIS 3.1 carrier modulation orders and adjust the node biases accordingly, significant power savings may be possible without any additional signal processing or specialized hardware. This dynamic approach may provide much greater potential power savings. The uniqueness of this process may be the application of sampling, algorithms, DOCSIS 3.1 modulation order adjustment, and RF bias adjustment, all together to enable power savings. This may be accomplished without needing to modify any subscriber or service group parameters (i.e., no re-provisioning). The only time that node 110 may operate at today's normal power levels may be if it is at maximum bandwidth and peak traffic load. At all other times, there may be appreciable power savings.

Consistent with embodiments of the disclosure, as a safeguard against an abnormal event in which traffic increases unpredictably (as in a onetime event such as a disaster), a safeguard to override the process may be implemented. This may be accomplished through measuring the peak bandwidth and comparing it to the historical and adjusting accordingly. Another embodiments may be to sample the peak on a one minute interval on a real time basis and adjust the modulation and power such that they always run with headroom (e.g., 2 dB of headroom), equivalent to no more than 70% of maximum capacity for example. This may be implemented using a number of different calculations. Embodiments of the disclosure may combine these measures and controls into a solution for dynamic power management.

A cable system may be upgraded to 1.2 GHz operation, meaning there is 1.1 GHz of spectrum available downstream in the forward path towards subscribers. If 500 MHz is reserved for MPEG video, then 600 MHz may remain for DOCSIS carriers. At 4096 QAM, this may provide a peak capacity of >5 Gbps to each service group. From historical measurements, the peak to valley data rates may vary by at least 4:1. If the peak is 5 Gbps, then the valley may be less than 1.25 Gbps. Since 4096 QAM provides two times the throughput of 64 QAM, during off peak we can go down to 64 QAM and still provide 2.5 Gbps peak throughput. This may take 18 dB less power than 4096 QAM. However, DOCSIS currently provides only a 10 dB adjustment range. Meaning we can only go down 10 dB, not a full 18 dB. Nevertheless, at 10 dB down, we support approximately 3 Gbps during off peak times. Since DOCSIS represents slightly more than 50% of the spectrum, and we are holding the video carriers constant, this means our power savings may be more than 7 dB across the spectrum. This may translate to approximately 10-40 watts per node. Based on observed traffic, we believe this savings may be possible for 50% of every day. If power adjustments are made more dynamically, the potential power savings may be greater. Similarly, if cable systems move to all IP video, the potential savings may be higher. Once controller 190 determines the bias value for node 110 to support the determined power value in stage 240, method 200 may then end at stage 250.

Figure 4:
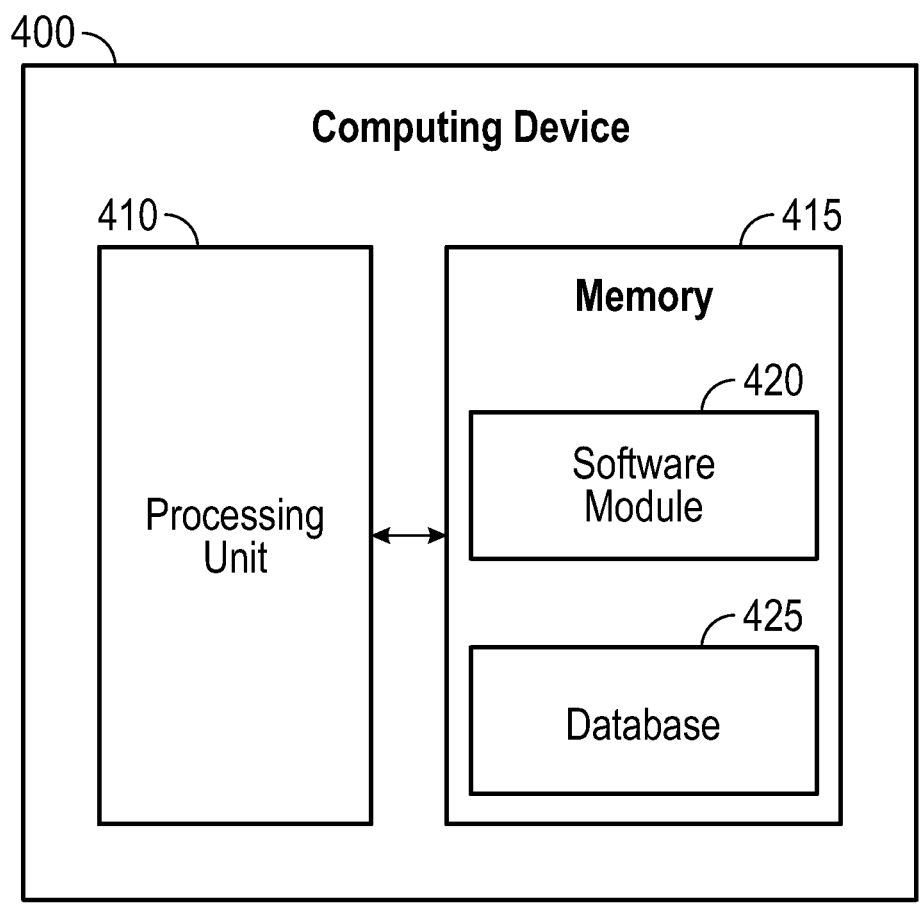
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for reducing dynamic power in cable access networks, including for example, any one or more of the stages from method 200 described above with respect to FIG. 2.

Computing device 190 may be implemented using a personal computer, a network computer, a mainframe, a router, or other similar microcomputer-based device. Computing device 190 may comprise any computer operating environment, such as hand-held devices, multiprocessor systems, microprocessor-based or programmable sender electronic devices, minicomputers, mainframe computers, and the like. Computing device 190 may also be practiced in distributed computing environments where tasks are performed by remote processing devices. The aforementioned systems and devices are examples and computing device 190 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    determining, by a controller, a peak data rate associated with a network;
    determining, for each carrier of the network, a modulation order and an associated Radio Frequency (RF) level that will support the determined peak data rate;
    determining a power value to be transmitted by a node in the network based on the determined modulation order and the associated RF level, wherein determining the power value comprises determining the power value comprising a total composite power required to carry Data Over Cable Service Interface Specification (DOCSIS) carriers and Moving Picture Experts Group (MPEG) video carriers simultaneously; and
    determining a bias value for the node to support the total composite power value.

2. The method of claim 1, wherein determining the peak data rate comprises determining the peak data rate gathered from historical sampling.

3. The method of claim 1, wherein determining the peak data rate comprises determining the peak data rate gathered from real time sampling.

4. The method of claim 1, wherein determining the modulation order comprises determining the modulation order comprising a Quadrature Amplitude Modulation (QAM) modulation order.

5. The method of claim 1, further comprising sending a command to a Converged Cable Access Platform (CCAP) to implement the determined modulation order.

6. The method of claim 1, further comprising sending a command to the node to implement the determined bias value.

7. The method of claim 1, wherein determining the modulation order and the associated RF frequency level that will support the determined peak data rate comprises determining the modulation order for the DOCSIS carriers.

8. The method of claim 1, wherein determining the modulation order and the associated RF frequency level that will support the determined peak data rate comprises determining the modulation order for the MPEG video carriers.

9. A system comprising:
a memory storage; and
a processing unit coupled to the memory storage, wherein the processing unit is operative to:
determine, by a controller, a peak data rate associated with a network,
determine, for carriers, a modulation order and an associated Radio Frequency (RF) level that will support the determined peak data rate,
determine a power value to be transmitted by a node in the network based on the determined modulation order and the associated RF level, wherein the processing unit being operative to determine the power value comprises the processing unit being operative to determine the power value comprising a total composite power required to carry Data Over Cable Service Interface Specification (DOCSIS) carriers and Moving Picture Experts Group (MPEG) video carriers simultaneously, and
determine a bias value for the node to support the total composite power value.

10. The system of claim 9, wherein the processing unit being operative to determine the peak data rate comprises the processing unit being operative to determine the peak data rate gathered from historical sampling.

11. The system of claim 9, wherein the processing unit being operative to determine the peak data rate comprises the processing unit being operative to determine the peak data rate gathered from real time sampling.

12. The system of claim 9, wherein the processing unit being operative to determine the modulation order comprises the processing unit being operative to determine the modulation order comprising a Quadrature Amplitude Modulation (QAM) modulation order.

13. The system of claim 9, wherein the processing unit is further operative to send a command to a Converged Cable Access Platform (CCAP) to implement the determined modulation order.

14. The system of claim 9, wherein the processing unit is further operative to send a command to the node to implement the determined bias value.

15. A non-transitory computer-readable medium that stores a set of instructions which when executed perform a method comprising:
determining, by a controller, a peak data rate associated with a network;
determining, for carriers, a modulation order and an associated Radio Frequency (RF) level that will support the determined peak data rate;
determining a power value to be transmitted by a node in the network based on the determined modulation order and the associated RF level, wherein determining the power value comprises determining the power value comprising a total composite power required to carry Data Over Cable Service Interface Specification (DOCSIS) carriers and Moving Picture Experts Group (MPEG) video carriers simultaneously; and
determining a bias value for the node to support the total composite power value.

16. The non-transitory computer-readable medium of claim 15, wherein determining the peak data rate comprises determining the peak data rate gathered from historical sampling.

17. The non-transitory computer-readable medium of claim 15, wherein determining the peak data rate comprises determining the peak data rate gathered from real time sampling.

18. The non-transitory computer-readable medium of claim 15, further comprising sending a command to a Converged Cable Access Platform (CCAP) to implement the determined modulation order.

19. The non-transitory computer-readable medium of claim 15, further comprising sending a command to the node to implement the determined bias value.

20. The non-transitory computer-readable medium of claim 15, wherein determining the modulation order comprises determining the modulation order comprising a Quadrature Amplitude Modulation (QAM) modulation order.

* * * * *